United States Patent
Ho et al.

[11] Patent Number: 6,135,795
[45] Date of Patent: Oct. 24, 2000

[54] ELECTRICAL CONNECTOR WITH COVER

[75] Inventors: Yu-Ming Ho, Pen-Chiao; Ming-Chuan Wu, Shu-Lin Chen, both of Taiwan

[73] Assignee: Hon Hai Precision Ind. Co., Ltd., Taipei Hsien, Taiwan

[21] Appl. No.: 09/116,694

[22] Filed: Jul. 15, 1998

[30] Foreign Application Priority Data

Jul. 15, 1997 [TW] Taiwan ................................ 86212165

[51] Int. Cl.[7] .................................................. H01R 13/44
[52] U.S. Cl. ............................................ 439/135; 439/940
[58] Field of Search ........................... 439/41, 135, 136, 439/940

[56] References Cited

U.S. PATENT DOCUMENTS

| | | | |
|---|---|---|---|
| 4,790,763 | 12/1988 | Weber | 439/65 |
| 5,147,209 | 9/1992 | Litwin et al. | 439/70 |
| 5,249,977 | 10/1993 | Tanaka et al. | 439/135 |
| 5,571,022 | 11/1996 | Schaarschmidt | 439/135 |
| 5,651,684 | 7/1997 | Northey et al. | 439/41 |

*Primary Examiner*—Khiem Nguyen

[57] ABSTRACT

A board-to-board connector assembled with an elongate cover, includes a housing forming a mating face, a soldering face, and a longitudinal channel in the mating face. The cover includes a central connecting portion having a pair of resilient arms perpendicularly extending from each lateral end thereof, a flat second surface for attachment of a vacuum nozzle, and a plurality of serially connected extension portions outwardly extending from the lateral ends of the connecting portion. A plurality of grooves are defined on both sides of the cover between each adjacent extension portions, whereby a predetermined number of extension portions can be readily removed to accommodate connectors of different size. After the connector is accurately aligned and soldered onto a mother board, the cover is removed from the connector so that a daughter board can be received in the channel.

17 Claims, 4 Drawing Sheets

ELECTRICAL CONNECTOR WITH COVER

BACKGROUND OF THE INVENTION

1. Field of the Invention

The present invention relates to an electrical connector, and more particularly to an electrical connector having a cover attached thereto which receives a suction force from a vacuum nozzle for mounting the connector onto a printed circuit board wherein the cover can be used with connectors of varying length.

2. The Prior Art

As the trend of the computer industry continues toward miniaturization, electrical connector terminal density increases and unoccupied space on the connector decreases which results in complications when accurately aligning the terminals with corresponding traces on a printed circuit board (PCB). If the improperly positioned terminals are soldered to the corresponding traces, a poor electrical connection between the connector and the PCB will result.

In order to ensure accurate alignment of the connector on the PCB, an adhesive film, as disclosed in U.S. Pat. Nos. 4,645,278 and 5,383,797 and Taiwan Pat. Nos. 83207484 and 85202861, is attached to the connector before the connector is positioned on the PCB whereby the terminals of the PCB can be aligned with the corresponding traces of the PCB. The connector is then fixedly soldered to the connector and the adhesive film is removed therefrom. This method requires manual attachment of the film, therefore, the lack of automation complicates assembly and increases manufacturing costs. In addition, the adhesive film is neither reusable nor recyclable which adversely affects the environment.

U.S. Pat. No. 5,249,977 discloses a cover for attaching to a mating surface of the connector whereby a vacuum nozzle can be attached thereto for aligning the connector onto a PCB before soldering thereto. However, the cover does not fully conceal a mating surface of the connector. Thus, foreign particles such as dust may enter the connector during transportation or storage and hinder the performance thereof.

A cover which fully conceals the mating surface of a connector is disclosed in U.S. Pat. Nos. 4,396,245 and 5,026,295. However, connectors of varying length each require a suitably sized cover which increases the cost of the cover molding process and complicates parts management.

Therefore, an improved connector cover is required which can overcome the drawbacks of the prior art.

SUMMARY OF THE INVENTION

An objective of the present invention is to provide a cover for a connector, having a flat surface for receiving a suction force from a vacuum nozzle whereby the connector can be properly aligned on a printed circuit board during automated assembly.

Another objective of the present invention is to provide a cover for an electrical connector, having an adjustable length whereby the cover can be used with connectors of different size.

In accordance with one aspect of the present invention, a board-to-board connector assembled with an elongate cover, includes a housing forming a mating face, a soldering face, and a longitudinal channel in the mating face. The cover includes a central connecting portion having a pair of resilient arms perpendicularly extending from each lateral end thereof, a flat second surface for attachment of a vacuum nozzle, and a plurality of serially connected extension portions outwardly extending from the lateral ends of the connecting portion. A plurality of grooves are defined on both sides of the cover between adjacent extension portions, whereby a predetermined number of extension portions can be readily removed to accommodate connectors of different size. After the connector is accurately aligned and soldered onto a mother board, the cover is removed from the connector so that a daughter board can be received in the channel.

These and additional objects, features, and advantages of the present invention will become apparent after reading the following detailed description of the preferred embodiment of the invention taken in conjunction with the appended drawings.

DETAILED DESCRIPTION OF THE PREFERRED EMBODIMENT

Figure 1:
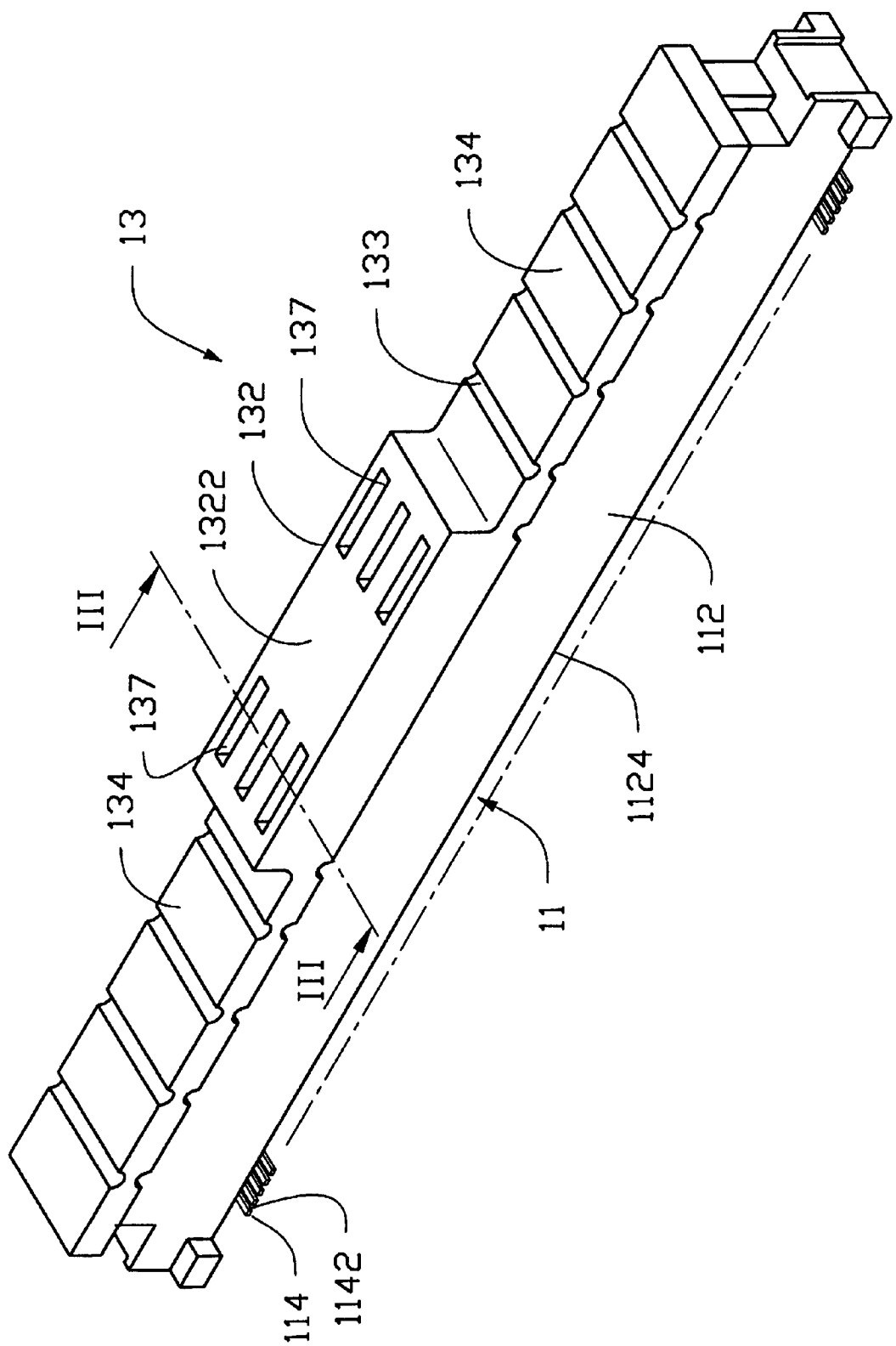
FIG. 1 is an assembled perspective view of an electrical connector and a cover in accordance with the present invention.
Figure 2:
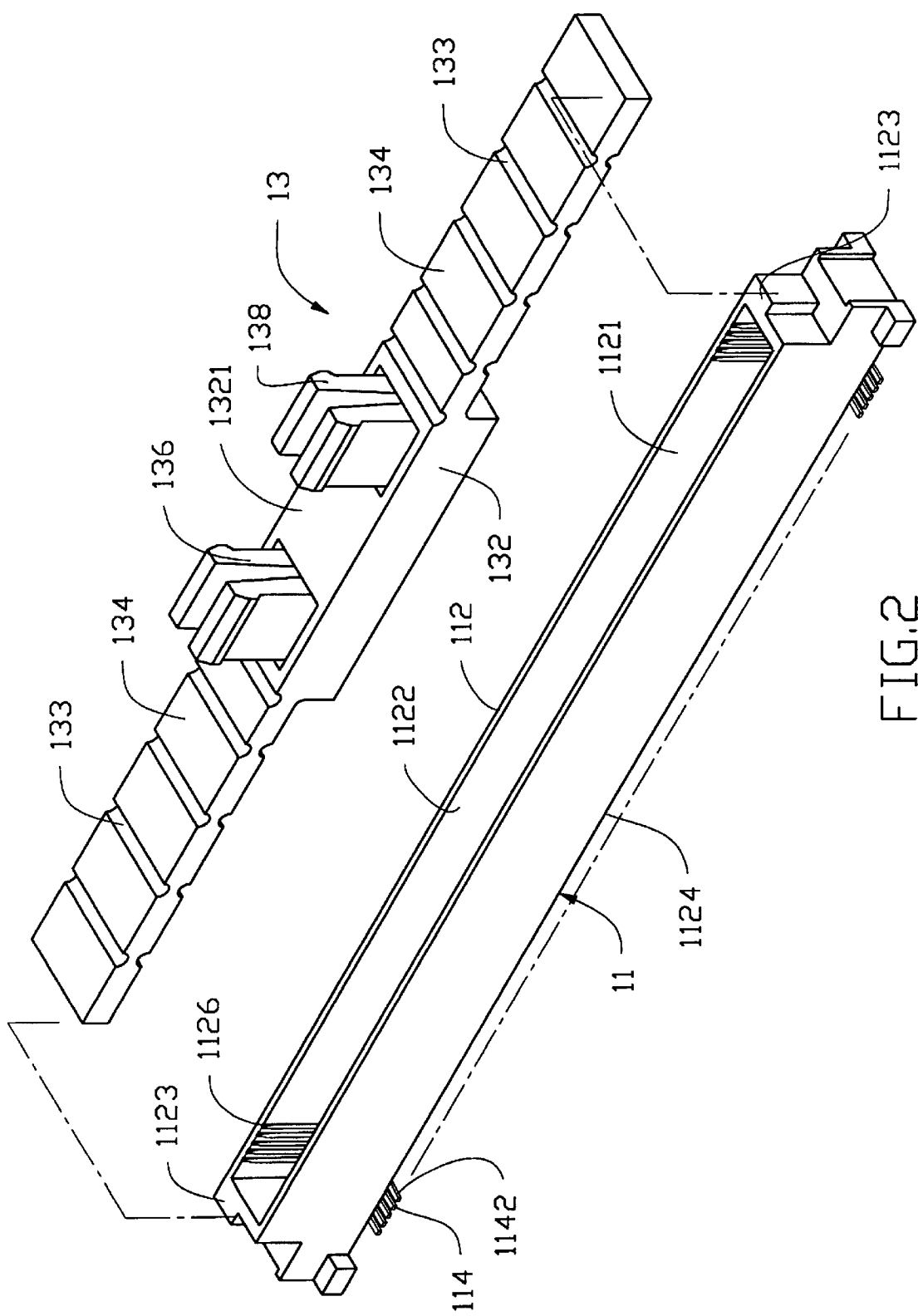
FIG. 2 is an exploded view of FIG. 1 showing a first surface of the cover.

Referring to FIGS. 1 and 2, a board-to-board connector 11 assembled with an elongate cover 13, includes a housing 112 forming a mating face 1123, a soldering face 1124, and a longitudinal channel 1121 in the mating face 1123. An inner wall 1122 of the channel 1121 defines passageways 1126 for respectively receiving a plurality of contacts 114. Soldering ends 1142 of the contacts 114 outwardly project from the soldering face 1124 of the housing 112 for being soldered to corresponding traces on a mother board (not shown).

The cover 13 includes a central connecting portion 132 having a first surface 1321 and a flat second surface 1322 for attachment of a vacuum nozzle (not shown), and a plurality of serially connected extension portions 134 outwardly extending from lateral ends of the central portion 132, wherein the connecting portion 132 is thicker than the extension portions 134. A plurality of grooves 133 are defined on both sides of the cover 13 between adjacent extension portions 134. A pair of resilient arms 136 perpendicularly extend from each lateral end of the first surface 1321 of the connecting portion 132, and slots 137 are defined through the connecting portion 132 on each side of each arm 136 for providing the arms 136 with more flexibility. Each arm 136 forms a tapered guiding and abutting head 138 at a free end thereof for facilitating insertion of the arms 136 into the channel 1121.

Figure 3:
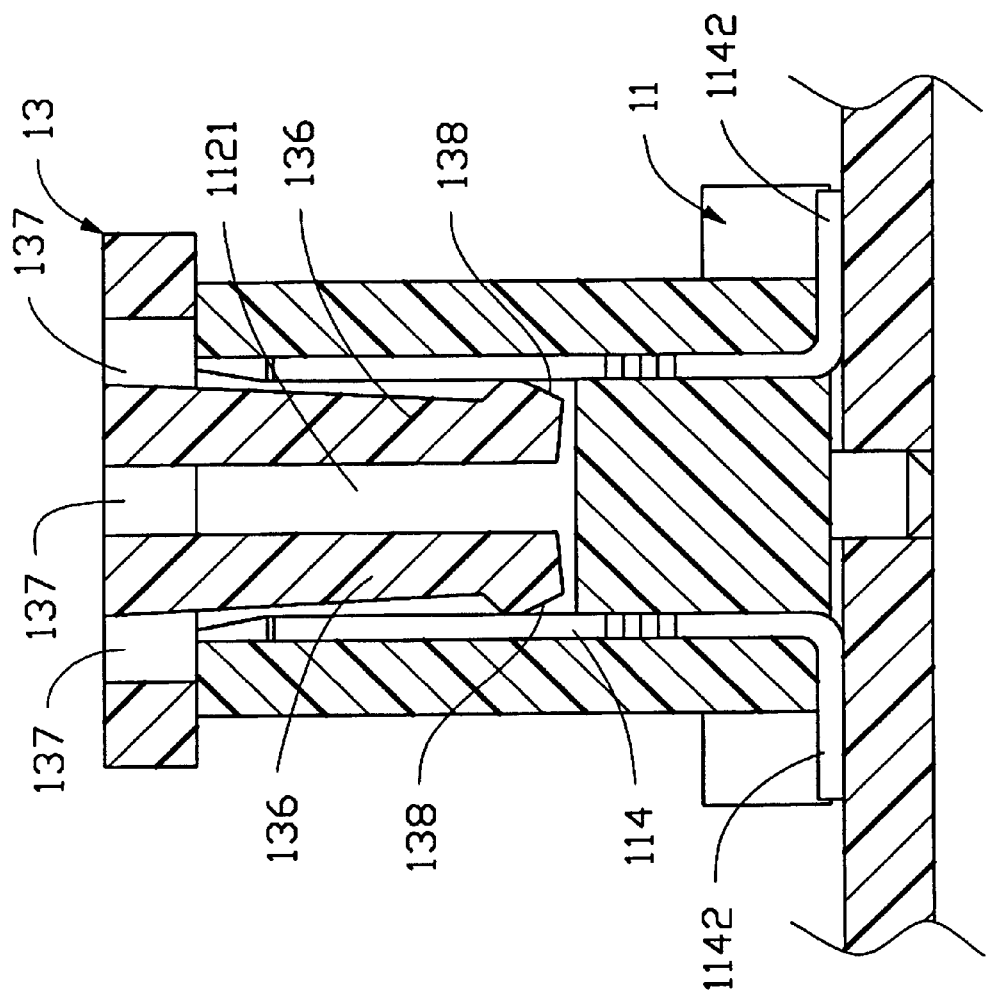
FIG. 3 is a cross-sectional view taken along line III—III of FIG. 1.

In assembly, after the contacts 114 are received in the corresponding passageways 1126 of the housing 112, the guiding and abutting heads 138 of the arms 136 are brought to contact the inner wall 1122 of the housing 112 which urges each pair of arms 136 together. A force is exerted on the second surface 1322 of the connecting portion 132 and the guiding and abutting heads of the arms 136 slide along the inner wall 1122 of the housing 112 until the first surface 1321 of the connecting portion 132 contacts the mating surface 1123 of the housing 112, as shown in FIG. 3. Thus, the cover 13 is retained within the channel 1121 of the housing 112.

An automated vacuum nozzle can be attached to the second surface 1322 of the cover 13 whereby the cover 13 together with the connector 11 can be accurately aligned and soldered onto a mother board. Thereafter, the cover 13 is removed from the connector 11 so that a daughter board (not shown) can be received in the channel 1121.

Figure 4:
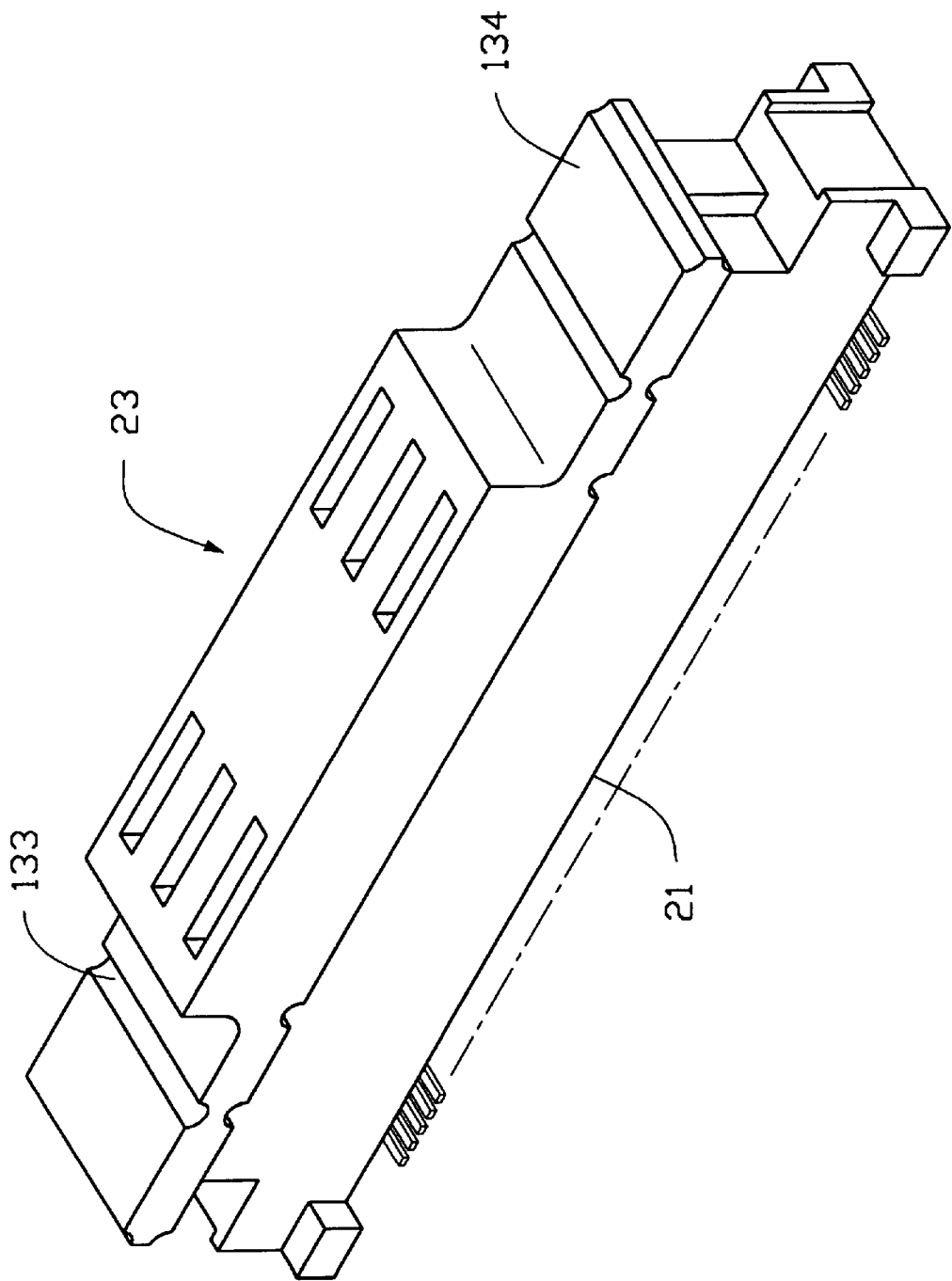
FIG. 4 is an alternative embodiment of the present invention showing how the length of the cover can be adjusted to accommodate a connector of different size.

Referring to FIG. 4, a cover 23 can be easily altered to accommodate a shorter connector 21 by removing the required number of extension portions 134. This is accomplished by bending the outer extension portions 134 at the appropriate groove 133 until the undesired extension portions 134 are separated from the cover 23.

While the present invention has been described with reference to a specific embodiment, the description is illustrative of the invention and is not to be construed as limiting the invention.

Therefore, various modifications to the present invention can be made to the preferred embodiment by those skilled in the art without departing from the true spirit and scope of the invention as defined by the appended claims.

We claim:

1. An electrical connector assembly comprising:

a board-to-board connector including a housing having a mating face, a soldering face, a longitudinal channel formed between both of the faces, and an inner wall defining a plurality of passageways;

a plurality of contacts respectively received in the passageways and having soldering ends outwardly projecting from the soldering face of the housing for being soldered to corresponding traces on a mother board;

an elongate cover comprising a connecting portion having a first surface and a second surface for attachment of a vacuum nozzle, a plurality of serially connected extension portions outwardly extending from the first surface of the connecting portion for retaining the cover in the channel of the housing;

whereby a predetermined number of extension portions can be readily removed to accommodate connectors of different size.

2. The assembly as described in claim 1, wherein a plurality of grooves are defined on both sides of the cover between adjacent extension portions.

3. The assembly as described in claim 1, wherein the connecting portion is thicker than the extension portions.

4. The assembly as described in claim 1, wherein the connecting portion is centered between the extension portions.

5. The assembly as described in claim 1, wherein slots are defined through the connecting portion on each side of each arm or providing the arms with more flexibility.

6. The assembly as described in claim 1, wherein each arm forms a tapered guiding and abutting head at a free end thereof for facilitating insertion of the arms into the channel of the connector.

7. An elongate cover for attaching to a board-to-board connector, comprising a connecting portion having a first outer surface and a second inner surface, a plurality of serially connected extension portions outwardly extending along a longitudinal direction of the connector from lateral ends of the connecting portion, and a plurality of means for being subjected to a bending force, the means being formed between adjacent extension portions;

wherein a predetermined number of extension portions can be readily removed to accommodate connectors of different size by bending the cover at an appropriate means.

8. The cover as described in claim 7, wherein the connecting portion is thicker than the extension portions.

9. The cover as described in claim 7, wherein at least a pair of resilient arms perpendicularly extend from the first surface of the connecting portion for retaining to the connector.

10. The cover as described in claim 9, wherein slots are defined through the connecting portion on each side of each arm or providing the arms with more flexibility.

11. The cover as described in claim 9, wherein each arm forms a tapered guiding and abutting head at a free end thereof for facilitating insertion of the arms into the connector.

12. The cover as described in claim 7, wherein said means are grooves.

13. An elongate cover for assembling with a board-to-board connector comprising a connecting portion having a first surface and a second surface for attachment of a vacuum nozzle, and a plurality of serially connected extension portions outwardly extending from at least one lateral end of the connecting portion; wherein a predetermined number of extension portions can be readily removed to accommodate connectors of different lengthwise size.

14. The cover as described in claim 13, wherein a plurality of grooves are defined on at least one side of the cover respectively between adjacent extension portions.

15. The cover as described in claim 13, wherein at least a pair of resilient arms perpendicularly extend from the first surface of the connecting portion for retaining the cover in the connector.

16. The cover as described in claim 15, wherein slots are defined through the connecting portion on each side of each arm for providing the arms with more flexibility.

17. The cover as described in claim 15, wherein each arm forms a tapered guiding and abutting head at a free end thereof for facilitating insertion of the arms into the connector.

* * * * *